United States Patent [19]

Long

[11] Patent Number: 4,907,764
[45] Date of Patent: * Mar. 13, 1990

[54] INFRARED RADIATION POWERED LIGHTWEIGHT AIRCRAFT

[76] Inventor: David E. Long, 6666 Glade Ave., Canoga Park, Calif. 91303

[*] Notice: The portion of the term of this patent subsequent to Oct. 6, 2004 has been disclaimed.

[21] Appl. No.: 204,019

[22] Filed: Jun. 8, 1988

[51] Int. Cl.[4] ............................................. B64D 27/24
[52] U.S. Cl. .................................. 244/62; 244/45 A; 244/45 R; 244/53 R; 244/58; 244/59
[58] Field of Search .............. 244/45 A, 59, 62, 53 R, 244/45 R, 58

[56] References Cited

U.S. PATENT DOCUMENTS 4,445,050 4/1984 Marks .
4,574,161 3/1986 Marks .
4,697,761 10/1987 Long .
4,720,642 1/1988 Marks .

OTHER PUBLICATIONS

Solar Drones Scan the Earth by Richard DeMeis from High Technology, pp. 10 & 12 (Jan. 1983).
LRV-2 Demonstrates Potential of Ultralights at High Altitudes, dtd. Dec. 6, 1982, from Aviation Week & Space Technology, p. 133.
Science Newsfront by Arthur Fisher, dtd. Feb. 1983.
Wings in the Sun: The Evolution of Solar Challenger by Martyn Cowley, from Flight International, Jun. 13, 1981.

Primary Examiner—Joseph F. Peters, Jr.
Assistant Examiner—Gregory R. Poindexter
Attorney, Agent, or Firm—Poms, Smith, Lande & Rose

[57] ABSTRACT

A high altitude reconnaissance platform is implemented by an ultralight aircraft powered solely by long wave infrared cells mounted on the lower surfaces of the wings and the fuselage. The aircraft may be of the pusher, slow speed propeller style, with a larger rear wing and a small, canard-type front wing. The bottom of the fuselage may be flat. The two wings may be vertically offset from one-another, and the cross-section of the wings may be relatively thick, with the ratio of the width of the wings to their thickness being in the order of about 6 to 8.

20 Claims, 3 Drawing Sheets

FIG. 1
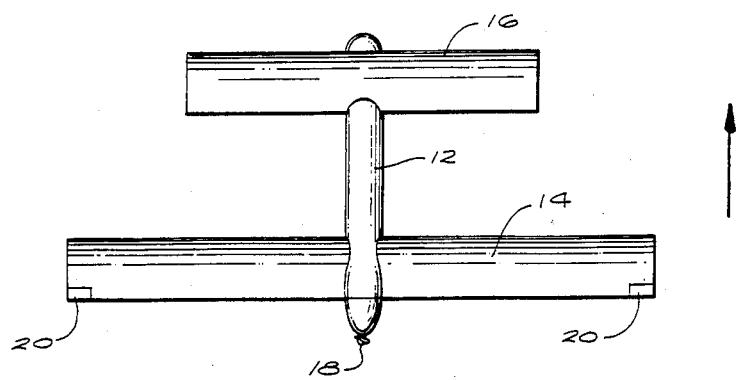
FIG. 2
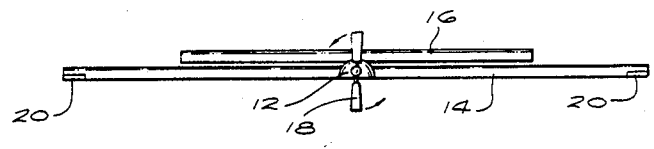
FIG. 3
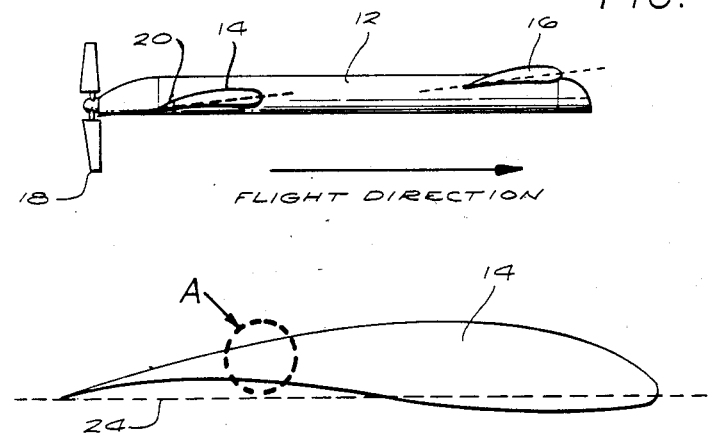
FLIGHT DIRECTION
FIG. 4
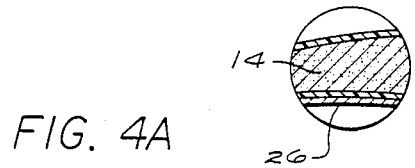
FIG. 4A

INFRARED RADIATION POWERED LIGHTWEIGHT AIRCRAFT

FIELD OF THE INVENTION

This invention relates to high altitude, lightweight aircraft, powered by incident radiation.

BACKGROUND OF THE INVENTION

It has long been considered desirable for governmental and commercial purposes to have a high altitude "platform" from which a payload (e.g. radiation sensors or other devices) can operate.

My prior U.S. Pat. No. 4,697,761, granted Oct. 6, 1987, discloses an aircraft which is powered by solar cells located on the upper surfaces of the aircraft, and by long wave infrared radiation responsive cells located on the lower surfaces of the aircraft. My system as disclosed in that patent contemplated that the solar cells would supply much more power while exposed to the sun, than the infrared cells. Batteries or fuel cells were used to store the excess power provided by the solar cells for use during periods when the sun was not shining. The requirement for batteries adds considerable weight to the aircraft, and the need for power supply switching circuitry added complexity and increased the possibility of system failure. The resultant payload for the aircraft was therefore somewhat less than optimum; and the required system power circuitry involving solar power, infrared power, battery power, and combinations thereof, was somewhat more complex than would be desired. Further, the need to rely on solar energy makes the system less capable than would be desired, because the incident solar radiation at the higher (and lower) latitudes is significantly reduced for an aircraft with horizontal solar arrays. Erecting the solar arrays to a more vertical orientation to maximize the incident solar radiation increases airframe weight penalties for hinges, erecting mechanisms and controls, thus detracting from payload weight.

Accordingly, principal objects of the present invention include providing a reliable lightweight aircraft, which is independent of solar energy, requires no array erecting mechanism, and which has relatively high payload and simplified electronics.

SUMMARY OF THE INVENTION

In accordance with the present invention it has been determined that an ultra lightweight aircraft may be powered solely by long wave infrared (LWIR) cells, having relatively high efficiency. These LWIR cells may be mounted on the lower surfaces of the aircraft, and LWIR radiation from the earth will provide a continuous supply of power for operation.

The physical configuration of the plane may be similar to that disclosed in my prior patent cited above; however, improved aerodynamic features which reduce the power requirements are disclosed in the present specification.

For completeness certain background materials will now be mentioned.

One proposal for a high altitude platform involved the U.S. Navy HI-SPOT blimp or balloon project. Apparently, some consideration was given to the possibility of using Long Wave Infrared Radiation (LWIR) from the earth to provide continuous power to such a blimp or balloon. An article discussing this possibility is entitled "A Radiation Thermoelectric Power Converter", L. W. Lemley, Naval Research Laboratory, pages 20 through 26, Symposium Report. It is understood that the possibility of using LWIR to power the blimp or balloon continuously, has not been implemented. It is noted that the foregoing article includes charts of the long wave infrared radiation available from the earth at different latitudes and at different times of the year, with the minimum (at the North Pole in December) being 120 watts per square meter, or about 11.1 watts per square foot, and this figure is being used for the purposes of the present aircraft design system.

Concerning cells for the conversion of LWIR to electrical energy, reference is made to the following patents of Alvin M. Marks: U.S. Pat. No. 4,445,050, granted Apr. 24, 1984; U.S. Pat. No. 4,574,161, granted Mar. 4, 1986; and U.S. Pat. No. 4,720,642, granted Jan. 19, 1988.

Concerning aircraft construction, the use of a "canard" or small front wing, with a larger rear wing, for slow flying aircraft, of the type under consideration in the present case, is disclosed in an article entitled "Wind-Tunnel Measurements of Wing Canard Interference and a Comparison with Various Theories", by T. W. Feistel et al., Business Aircraft Meeting & Expo, Wichita, Kansas Apr. 7–10, 1981, SAE Paper No. 810575. It is noted that vertical displacement of the two wings is desirable, to improve aerodynamic efficiency. Also, at low speeds, and under the flight conditions discussed herein, it is desirable that the wing cross-section be somewhat thicker than that discussed in my prior patent, for increased lift, and more specifically that the ratio of width to thickness of the wing be less than about 10 or 12, preferably in the order of about 6 to 8.

Other objects, features and advantages will become apparent from a consideration of the following detailed description and from the following detailed description.

BRIEF DESCRIPTION OF THE DRAWINGS

FIG. 1 is a top view of an aircraft which may be employed in the implementation of the present invention;

FIG. 2 is a rear view of the aircraft of FIG. 1;

FIG. 3 is a side view of the aircraft of FIGS. 1 and 2;

FIG. 4 is a cross-sectional view of the wing configuration of the aircraft of FIGS. 1 through 3;

FIG. 4a is a detail of the portion of FIG. 4 which is encompassed by a circle;

DETAILED DESCRIPTION

Figures 5, 6, 7:
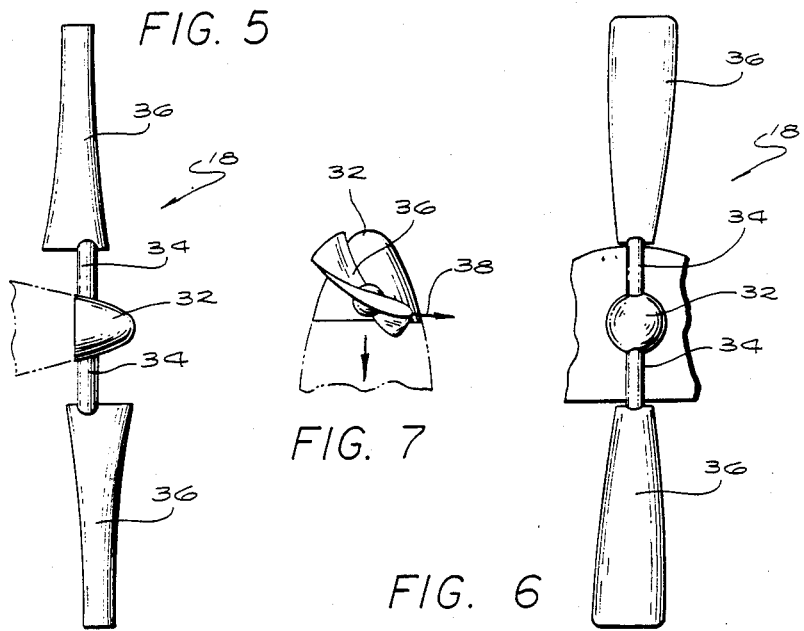
FIGS. 5, 6 and 7 are different views of a propeller employed to power the aircraft of FIGS. 1 through 4.

Referring more particularly to the drawings, FIGS. 1 through 3 are various views of a High Altitude Reconnaissance Platform (HARP) or aircraft which may be employed in the implementation of the present invention. More particularly, the aircraft of FIG. 1 includes a fuselage 12, a main wing 14 which is located near the rear of the pusher-type aircraft, and a smaller wing, or canard 16 which is mounted toward the front of the aircraft. The aircraft is powered by a pusher-type propeller 18 which is mounted at the rear of the aircraft.

The orientation of the aircraft is controlled by the adjustable flaps 20 which are located at the rear outer corners of the main wing 14. With regard to aerodynamic properties of the aircraft, attention is directed to an article entitled "Wind-Tunnel Measurements of Wing-Canard Interference and a Comparison with Various Theories", by T. W. Feistel et al., SAE Paper No. 810575, presented at the Business Aircraft Meeting, Wichita, Kan., Apr. 7–10, 1981. In this article, the desirability of having the canard spaced vertically away from the wing, as shown in FIGS. 2 and 3 of the present drawings, is discussed, and indicated as being desirable, to improve aerodynamic performance.

The showing of FIG. 4 is a cross-sectional view through the wing, and FIG. 4A is a detailed cross-sectional view of one portion of the wing structure indicated by a circle in FIG. 4. The dashed line 24 is the chord line for the wing configuration. A particular wing cross-sectional configuration is taken from a publication entitled "Alle Rechte, auch die des Nachdrucks im Auszug . . . ", 1972, Institut fur Aerodynamik und Gasdynamik der Universitat Stuttgart. As indicated in FIG. 4a, the upper and lower surfaces of the wing 14 and canard 16, are covered by a thin polymeric material (e.g. KAPTON), and a long wave infrared cell array 26 is located on the lower surface of the wing 14, canard 16 and fuselage 12.

The airframe structure is formed of Kevlar type plastic spars and stringers, as well as ribs, and has an external envelope of a polymeric sheet which may be 0.002 inch thick, for example. The aircraft materials and spar and stringer arrangements are of the configuration employed heretofore and known as ultra lightweight aircraft. With regard to the design configuration of ultra lightweight airplanes, reference is made to the known construction of Paul McReady's Gossamer Condor and Albatross, to the MIT Monarch aircraft (see page 21 of the May 21, 1984 issue of Aviation Week and Space Technology and to DuPont Company's KEVLAR Design Standards Book.

Concerning the dimensions of the aircraft, the aircraft may be 65 feet long, 128 feet from wing tip to wing tip, and each of the wings may be 12.8 feet in width. The fuselage may be approximately 8 feet wide, and the smaller or canard wing may be 77 feet from end to end. The total area on the two wings and the flat lower surface of the fuselage, which are facing downward, and which are covered by the LWIR array, have a combined area of approximately 3,000 sq. ft.

Referring now to FIGS. 5 through 7, they show the pusher propeller employed to power the aircraft of FIGS. 1 through 4. More specifically, the propeller of FIGS. 5 through 7 includes a rotating central hub 32, two tubular support members 34 and two specially curved propeller blades 36 secured to the tubular support members 34. The configuration of the propeller blades 36 may be noted from the curvature as shown in FIG. 7 and from the cross-sectional configuration of FIG. 4. It may of course be noted that, with the propeller travelling at a relatively slow rotational speed, the configuration of the propeller is somewhat different from that of conventional high speed propellers. The configuration of the propeller blades 36 may be particularly noted from FIG. 7, in that, with the outer ends of the propeller blades 36 travelling at a much greater speed through the atmosphere than the inner portions of the blades 36, the outer edges of the blade make a much smaller angle with respect to the direction of travel of the propeller, indicated by arrow 38 in FIG. 7, than the surface of the portion of the blades 36 which are closer to the support members 34.

Concerning representative dimensions for the propeller, the distance across the entire propeller is 11 feet, with two blades of approximately 4.5 feet each being mounted on the KEVLAR tubes 34 secured to hub 32. The blade chord is 2.0 feet. The speed of rotation of the propeller is about ten revolutions per second, and the Reynolds number at a height of approximately 100,000 feet, would be approximately 75,000, for the tip of the blade, using the airfoil configuration as shown in FIG. 4 of the drawings.

The amount of power required to fly the aircraft was now calculated. For the HARP vehicle, a height of 100,000 feet was postulated. The Reynolds number of the aircraft is in the order 200,000, and the angle of attack of the wings was approximately 6 degrees. With the coefficient of lift being approximately 1.15, and the coefficient of drag being approximately 0.014, their ratio is approximately 82. The wing area is approximately 2560 sq. ft., and the chord of each of the wings is approximately 12.8 feet, and the vehicle weight is approximately 1160 pounds. The dynamic pressure may then be calculated to be approximately 0.394 pounds per square foot. The cruising velocity may then be calculated as the square root of twice the dynamic pressure divided by the air density, which is approximately 0.00003318 at 100,000 feet altitude. The cruising velocity is therefore calculated to be approximately 154 feet per second or approximately 105 miles per hour. The vehicle drag, the summation of the wing drag, the fuselage drag and the wing-fuselage interface drag, is then calculated to be approximately 16.8 pounds. Adding 20 percent for uncertainty, the vehicle drag becomes 20 pounds.

The power required from the long wave infrared array is now calculated. First, the efficiencies of the various aircraft components are considered, with the propeller efficiency being estimated at 80 percent, that of a brushless DC motor at 95 percent, the motor controller at 95 percent and the power distribution controller also at 95 percent. Multiplying these efficiencies gives a system efficiency of about 68 percent in converting the power generated at the long wave infrared array to output power from the propeller to deliver a thrust of 20 pounds. Calculations indicate that the propeller power is approximately 9.25 horsepower to produce the desired thrust, and this is approximately equal to 6.9 kilowatts.

Now, with reference to FIG. 4A of the drawings, we have noted that the lower surfaces of the wing are covered with long wave infrared cells 26. An array of these infrared electricity generating cells are also mounted on the flat lower surface of the fuselage 12 of the aircraft.

Figure 9:
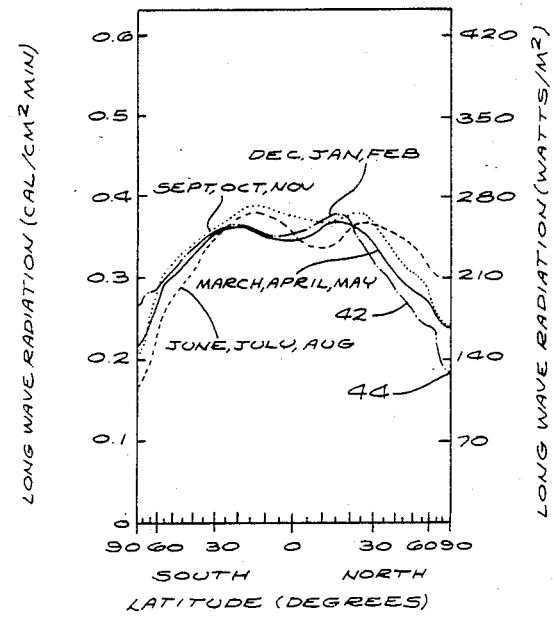
FIG. 9 is a series of plots of long wave infrared radiation radiated from the earth plotted against latitude.

With reference to FIG. 9 of the drawings, the long wave infrared radiation from the earth is calculated for various months of the year, as well as for various latitudes, in degrees. Picking one of the least favorable conditions, attention is directed to the plot designated 42 in FIG. 9 which relates to the months of December, January and February. Referring to point 44, representing 90 degrees north latitude, or the North Pole, the infrared radiation from the earth is approximately 120 watts per square meter, or approximately 11.1 watts per square foot. As to the variation of long wave infrared radiation over a typical 24 hour period, NASA Space Vehicle Design Criteria (Environment) SP-8067 entitled "Earth Albedo and Emitted Radiation, dated July 1971, indicates that the typical daily variation is plus or minus 15 percent about the mean value for relatively short periods during each day.

As mentioned above, the downward facing area of the larger wing is approximately 1600 sq. ft., and that of the rear wing is approximately 960 sq. ft., while that of the fuselage is approximately 8×55 feet, excluding the wing duplication, and is therefore equal to approximately 440 sq. ft. These three areas total approximately 3,000 sq. ft. Multiplying this 3,000 sq. ft. figure by the incident radiation of 11.1 watts per square foot gives a figure of approximately 33.3 kilowatts. In personal communications with Mr. Alvin M. Marks, the inventor in the Power Converter patents cited hereinabove, it was indicated that an efficiency of substantially above 50 percent is practical. However, for the present purposes, a more conservative figure of 35 percent will be employed, and this gives a net output of 11.6 kilowatts from the array. Where the power requirements for the aircraft including the payload, are only 10.0 kilowatts, an adequate margin is present to power the aircraft continuously even at the North Pole in December. Of course, with reference to FIG. 9 of the drawings, during other times of the year, and at less extreme latitudes, the long wave radiation greatly increases, and the excess power could be employed to fly the aircraft faster and at higher altitudes. It is further noted that the power requirements drop significantly at lower altitudes, and accordingly, even with somewhat less levels of power available, the aircraft could still fly readily at 60,000 ft., for example.

Concerning the weight of the aircraft, the following table indicates the ultralight structure components weights, with the airfoil configuration as discussed in connection with FIGS. 1 through 4:

| | |
|---|---|
| Fuselage | 47.6 lbs. |
| Rear Wing | 146.7 lbs. |
| Forward Wing | 83.0 lbs. |
| Long Wave Infrared Panels | 294.0 lbs. |
| Flight Control | 20.0 lbs. |
| Guidance | 20.0 lbs. |
| Propeller | 34.0 lbs. |
| Motor and Transmission | 40.0 lbs. |
| Power Controller and Distributor | 5.0 lbs. |
| Subtotal | 690.3 lbs. |
| Payload | 470.0 lbs. |
| Vehicle Gross Weight | 1160.3 lbs. |

The figure of 1160 pounds was employed in the calculation of power requirements, as noted above.

Figure 8:
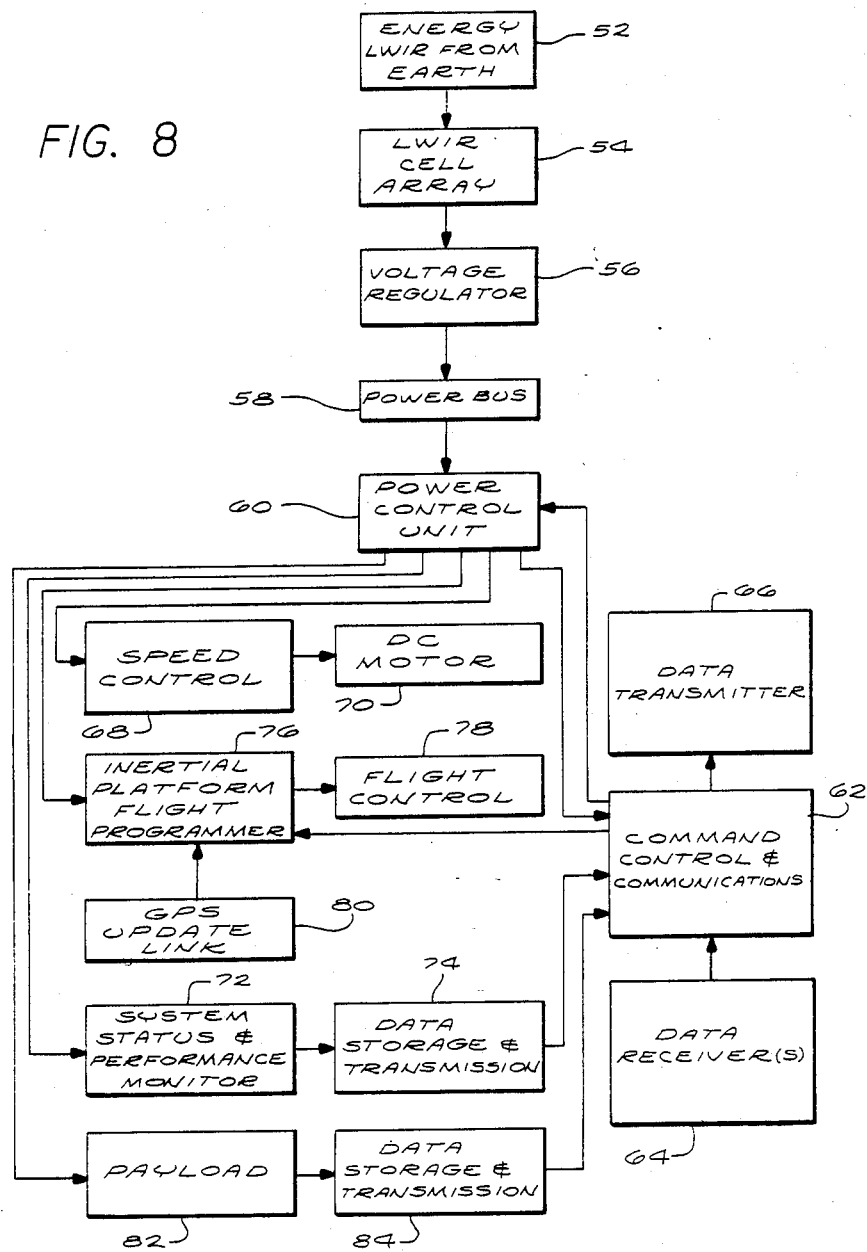
FIG. 8 is a block circuit diagram of the electrical power system for the aircraft.

Referring now to FIG. 8 of the drawings, block 52 represents the long wave infrared energy from the earth, and block 54 represents the infrared cell array mounted on the lower surfaces of the aircraft. Blocks 56 and 58 represent the voltage regulator and the power bus, leading to the power control unit 60. All of the components shown in FIG. 8 which require power are supplied from the power control unit 60. The command control and communications unit 62 receives input signals from the data receiver or receivers 64 both to receive instructions from another aircraft or the ground for external control of the otherwise autonomous high altitude reconnaissance platform, and also from blocks and 84, receiving system status data and intelligence data or photographic data from the onboard sensors. The signals from the aircraft are transmitted to another aircraft or the ground station over the data transmitter 66. Other circuits included in FIG. 8 are the speed control circuitry 68 for powering the DC motor 70, the system status and performance monitor circuitry 72 and the data storage and transmission circuit 74. Also included in FIG. 8 are the inertial platform flight programmer 76, the flight control circuitry 78 and the global position system update link 80. The flight control circuit 78 involves the circuitry for operating the flaps 20 for controlling the flight path of the aircraft through electromechanical linkages, for example. The block 80, the global position system update link, applies satellite derived corrections to update the position of the aircraft, periodically, in view of the drift which normally occurs in an inertial platform locating system such as that shown at block 76. The payload is indicated at block 82, and the data storage and transmission circuitry 84 permits the accumulation of significant quantities of data for subsequent later rapid transmission through circuits 62 and 66.

In conclusion, reference is again made to my prior U.S. Pat. No. 4,697,761. In the present patent application, one improved aerodynamic design has been shown, but the design shown in my prior patent application could also be employed with some increase in power requirements. Other ultra lightweight designs could also be employed. In addition, instead of using a pusher propeller aircraft configuration, a conventional arrangement with the propeller in the front of the aircraft could be employed. Also, the arrangements as shown in my prior patent for controlling the attitude and direction of flight of the aircraft could be employed in place of the flaps 20 as shown in the present patent application. Further, one type of long wave infrared radiation cell has been identified, but others, including those disclosed in my prior patented system could also be used. Accordingly, the present invention is not limited to the specific embodiment as shown in the drawings, and discussed hereinabove in the detailed description.

What is claimed is:

1. A high altitude, ultralight aircraft requiring no fuel comprising:

an aircraft having wings with broad area lower wing surfaces and a fuselage;

a low speed propeller mounted on said aircraft;

electric motor means mounted on said aircraft and coupled to drive said propeller;

long wavelength infrared (LWIR) responsive cell means for receiving infrared energy radiated from the earth and for supplying electricity to power said motor means, said LWIR cell means being mounted on the lower surfaces of said wings and said fuselage; and said LWIR being substantially the only source of input power for said aircraft to provide a continuous source of power both during the day and at night;

whereby the aircraft may have a life at elevated altitudes of several years.

2. A high altitude, ultralight aircraft as defined in claim 1 wherein said propeller is a low speed, large area propeller and said electric motor means powers said propeller solely from said LWIR cell means to continuously drive said aircraft at a velocity of between 60 miles per hour and 200 miles per hour.

3. A high altitude, ultralight aircraft as defined in claim 1 wherein said aircraft has an effective lower surface area of at least 2500 square feet.

4. A high altitude, ultralight aircraft as defined in claim 1 wherein the bottom of said fuselage is substantially flat.

5. A high altitude, ultralight aircraft as defined in claim 1 further including means for transmitting signals from said aircraft, and means for receiving signals at said aircraft.

6. A high altitude, ultralight aircraft as defined in claim 1 wherein said aircraft has a pusher-type propeller configuration, with the propeller mounted at the rear of the aircraft fuselage.

7. A high altitude, ultralight aircraft as defined in claim 1 wherein the aircraft has a relatively large rear wing and a relatively smaller canard-type front wing.

8. A high altitude, ultralight aircraft as defined in claim 1 wherein the aircraft has two wings, and wherein said wings are vertically displaced from one another, to maximize aerodynamic efficiency.

9. A high altitude ultralight aircraft as defined in claim 1 wherein the ratio of the width to the thickness of the wings is less than 12.

10. A high altitude ultralight aircraft as defined in claim 1 wherein the ratio of the width to the thickness of the wings is in the order of about 6 to 8.

11. A high altitude, ultralight aircraft requiring no fuel comprising:
an aircraft having wings with broad area lower wing surfaces and a fuselage;
a low speed propeller mounted on said aircraft;
electric motor means mounted on said aircraft and coupled to drive said propeller;
long wavelength infrared (LWIR) responsive cell means for receiving infrared energy from the earth and for supplying electricity to power said motor means, said LWIR cell means being mounted on the lower surfaces of said wings and said fuselage;
said LWIR being substantially the only source of input power for said aircraft to provide a continuous source of power both during the day and at night; and
said aircraft having a relatively large rear wing and a smaller canard-type front wing, with said two wings being vertically displaced from one-another;
whereby the aircraft may have a life at elevated altitudes of several years.

12. A high altitude, ultralight aircraft as defined in claim 11 wherein said propeller is a low speed, large area propeller and said electric motor means powers said propeller solely from said LWIR cell means to continuously drive said aircraft at a velocity of between 60 miles per hour and 200 miles per hour.

13. A high altitude, ultralight aircraft as defined in claim 11 wherein the bottom of said fuselage is substantially flat.

14. A high altitude ultralight aircraft as defined in claim 11 wherein the ratio of the width to the thickness of the wings is less than 12.

15. A high altitude, ultralight aircraft requiring no fuel comprising:
an aircraft having wings with broad area lower wing surfaces and a fuselage;
a low speed propeller mounted on said aircraft;
electric motor means mounted on said aircraft and coupled to drive said propeller;
long wavelength infrared (LWIR) responsive cell means for receiving infrared energy from the earth and for supplying electricity to power said motor means, said LWIR cell means being mounted on the lower surfaces of said wings and said fuselage;
said LWIR being substantially the only source of input power for said aircraft to provide a continuous source of power both during the day and at night; and
the ratio of the width to the thickness of said wings being less than 12;
whereby the aircraft may have a life at elevated altitudes of several years.

16. A high altitude, ultralight aircraft as defined in claim 15 wherein said propeller is a low speed, large area propeller and said electric motor means powers said propeller solely from said LWIR cell means to continuously drive said aircraft at a velocity of between 60 miles per hour and 200 miles per hour.

17. A high altitude, ultralight aircraft as defined in claim 15 wherein the bottom of said fuselage is substantially flat.

18. A high altitude, ultralight aircraft as defined in claim 15 further including means for transmitting signals from said aircraft, and means for receiving signals at said aircraft.

19. A high altitude, ultralight aircraft as defined in claim 15 wherein said aircraft has a relatively large rear wing and a relatively smaller canard-type front wing, with the two wings being vertically displaced with respect to one-another to maximize aerodynamic efficiency.

20. A high altitude, ultralight aircraft as defined in claim 15 wherein said aircraft has a pusher-type propeller configuration, with the propeller mounted at the rear of the aircraft fuselage.

* * * * *